United States Patent
Springer

[11] Patent Number: 5,586,856
[45] Date of Patent: Dec. 24, 1996

[54] LIFT APPARATUS

[76] Inventor: William O. Springer, 709 37th Ave. North, Fargo, N. Dak. 58102

[21] Appl. No.: 424,860

[22] Filed: Apr. 19, 1995

[51] Int. Cl.⁶ .................................................. B60P 9/00
[52] U.S. Cl. ................................................. 414/462
[58] Field of Search ........................... 414/462, 469, 414/546

[56] References Cited

U.S. PATENT DOCUMENTS

| | | | |
|---|---|---|---|
| 2,753,063 | 7/1956 | Abel | 414/462 |
| 3,048,291 | 8/1962 | Mabry | 414/462 |
| 3,128,893 | 4/1964 | Jones . | |
| 3,170,583 | 2/1965 | Meyer . | |
| 3,411,644 | 11/1968 | Cook | 414/462 |
| 3,550,800 | 12/1970 | Robinson | 414/462 |
| 3,565,271 | 2/1971 | Deck | 414/462 |
| 3,648,866 | 3/1972 | Slown | 414/462 |
| 3,716,156 | 2/1973 | Risney | 414/462 |
| 3,732,998 | 5/1973 | Martin | 414/462 |
| 3,840,133 | 10/1974 | Berg | 414/462 |
| 3,877,594 | 4/1975 | Coakley | 414/462 |
| 3,885,689 | 5/1975 | Grove et al. | 414/462 |
| 3,927,779 | 12/1975 | Johnson | 414/462 |
| 3,976,213 | 8/1976 | Ball | 414/462 |
| 4,058,243 | 11/1977 | Tappan | 414/462 |
| 4,239,438 | 12/1980 | Everson | 414/462 |
| 4,269,561 | 5/1981 | Rutten | 414/462 |
| 4,469,346 | 9/1984 | Low | 280/414.1 |
| 4,531,879 | 7/1985 | Horowitz | 414/462 |
| 4,907,934 | 3/1990 | Holladay | 414/462 |
| 4,953,757 | 9/1990 | Stevens et al. | 414/462 |
| 5,069,595 | 12/1991 | Smith et al. | 414/462 |
| 5,108,248 | 4/1992 | Murrill | 414/462 |
| 5,123,799 | 6/1992 | Breazeale | 414/462 |

Primary Examiner—Karen B. Merritt
Assistant Examiner—Douglas Hess
Attorney, Agent, or Firm—Merchant, Gould, Smith, Edell, Welter & Schmidt, P.A.

[57] ABSTRACT

A lift apparatus mounts to a vehicle for raising and lowering a storage platform from a position behind the vehicle in a substantially horizontal position to a position above the vehicle in a substantially horizontal position. The lift includes an added wheel assembly and framework at the rear of the vehicle and lift arms which pivot forward and rearward from a lower portion of the added framework. Extensible retractable arm portions drive and retract arms between a lowered and raised position. The platform pivots about the ends of the arms and an end portion and a cross member extending above the rear framework. The platform pivots about the rear framework during a portion of the lowering and raising operation. The lift is also includes an adjustable frame and platform wheels which provide for mounting the lift to a variety of vehicles.

23 Claims, 7 Drawing Sheets

LIFT APPARATUS

BACKGROUND OF THE INVENTION

1. Field of the Invention

The present invention is directed to a lift apparatus and in particular to a lift which attaches to a vehicle for lifting a platform or rack from a lowered position behind the vehicle to a position above the vehicle.

2. Description of the Prior Art

It can be appreciated that it is often desirable to tow two or more trailers to move equipment and recreational vehicles. However, with a typical arrangement, the vehicle can normally tow only one trailer. In other instances, a boat, canoe, a motorcycle, bicycles, or other equipment may be stored on the roof of a car or truck and a trailer towed. However, this arrangement makes it difficult to access the items loaded above the vehicle. Loading and unloading of the rooftop equipment must be done manually, requiring much time. Loading and unloading typically requires several people to lift the equipment to and from the roof of the vehicle.

To overcome these problems, devices have been developed which are capable of lifting a platform from a lowered position to a raised position for transporting boats and other equipment above the vehicle. However, these devices generally suffer from several problems which make their usage less convenient. Several of the devices still require demanding manual labor to elevate the boat or other device to its raised position and to move to a lowered position. The devices generally have a large framework which interferes with the vehicle's lights and the driver's field of vision. Full usage of the vehicle's doors may not be available, thereby limiting access to the vehicle. A large framework may also make maneuvering a vehicle much more difficult. The added weight often decreases the vehicle's handling and stability and adds substantial additional weight to both axles of the vehicle. The devices are typically very complicated to attach and operate, as well as being expensive.

Prior art devices generally do not provide for adequate use when in the lowered position. The devices generally do not provide for supporting a boat in a lowered position so that it may be loaded from or unloaded into the lake. The devices are often configured for storing a boat in an upside down position so that manual labor is still required to flip the boat for usage. In addition, devices generally do not provide for backing the lowered device into the water. Such devices also do not provide for adjusting the height of the device in the lowered position to improve launching and recovery.

It can be seen then, that an improved lift apparatus is needed which can lift equipment from a lowered position behind a vehicle to a raised position above the vehicle. Such a device should provide adequate support for the equipment when in both the lowered and raised positions so that weight supported by the vehicle is minimal. In addition, such an apparatus should require minimum manual labor by an operator and should not interfere with the operation of any of the vehicle's lights or doors and windows. The lift apparatus should also provide for supporting the equipment in a substantially level position when lowered and should provide trailering capabilities which may be required for launching and recovering boats from the water. A lift apparatus should also be easily adaptable to various vehicle makes and models. The present invention addresses these as well as other problems associated with lift devices.

SUMMARY OF THE INVENTION

The present invention is directed to a lift apparatus, and in particular to a lift apparatus such as may be utilized with vehicles for raising objects above the vehicle for transportation. According to the present invention, the lift mounts at the rear of the vehicle and adds a wheel assembly acting as an extra axle for supporting the added weight of an object lifted above the vehicle.

The lift apparatus utilizes a platform or other support which is designed for supporting articles such as boats, jet skis and other watercraft, bicycles and motorcycles, or industrial supplies above the vehicle during normal operation. The platform is movable from a position above the vehicle to a position behind the vehicle where it is lowered to a substantially horizontal position.

A drive mechanism includes telescoping members which may be driven by worm type drives or hydraulics, mounted to the arms to pivot the arms forward and rearward, thereby lifting and lowering the platform. The arms are slightly bent upward and forward to extend around doors of the vehicle so that access is not impaired. Moreover, the framework for the vehicle extends upward around rear brake and operating lights so that safety and visibility are not impaired. The added axle provides an added framework which may include a hitch so that in the operating position, the vehicle may tow a trailer, thereby doubling the carrying capacity.

In operation, the lift raises an object from a beginning position wherein the arms are fully lowered. At this position, the upper ends of the arms are extending rearward, substantially parallel to the ground with the platform in a substantially horizontal position. As the drives are engaged, the arms are pushed forward, thereby lifting the front portion of the platform upward. The rear of the platform is supported by a pair of platform wheels which roll along the ground until the rear of the platform is lifted upward. The motion of the arms continues forward until a framework cross member extending above the wheels of the lift mechanism engage a portion of the platform to the rear of the attachment point to the arms. The platform pivots about the framework and the rear of the platform is lifted upward. As the arms continue to pivot forward, the front of the platform will be lowered while the rear continues to rise until the platform again obtains a substantially horizontal position above the vehicle.

Lowering the platform begins with the arms extended in a forward and upward position with the platform substantially in a horizontal position. As the drives are retracted, the arms pivot rearward so that the front of the platform lifts upward while the rear of the platform pivots about the lift framework. As the motion continues backward, the rear of the platform will eventually lower so that the platform wheels engage the ground. At this point, the arms continue to support the forward portion of the platform while the rear wheels roll rearward. As the arms pivot rearward, the front of the platform will lower as the arms extend rearward, becoming more horizontal. Eventually the arms extend to a position rearward at a low enough point so that the platform is substantially horizontal.

A roof rack may be utilized to support the forward portion of the storage platform, but in the present configuration is needed to support only 100 to 150 pounds while the added framework supports the rest of the load and passes it through to the extra wheels. The framework cross members may have rollers placed thereon to facilitate pivoting about the frame.

The present invention also includes adjustable platform wheels which may be retracted during transportation in the raised position and which are adjustable to raise and lower the platform between different heights when lowered. Moreover, the lift has an adjustable framework to mount on different vehicles and in some applications where lighter loads are being lifted, the lift may be mounted without an added axle. The support platform may be configured in several embodiments to fully support and retain the articles being transported.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

In the drawings, wherein like reference letters and numerals designate corresponding elements throughout the several views.

DETAILED DESCRIPTION OF THE PREFERRED EMBODIMENT(S)

Figure 1:
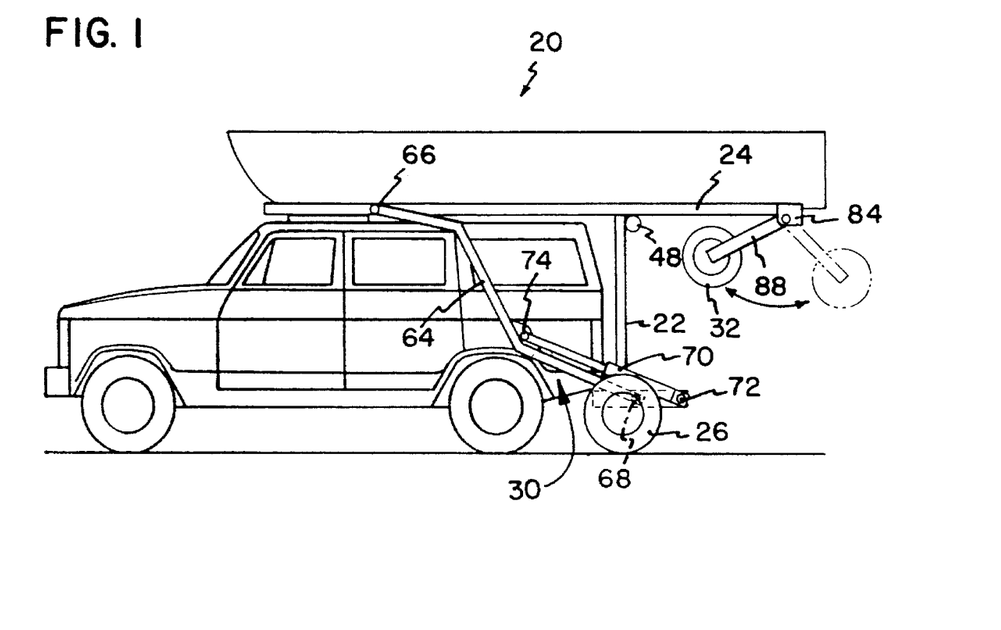
FIG. 1 shows a side elevational view of a lift apparatus in a raised position according to the principles of the present invention.

Referring now to the drawings, wherein like reference numerals designate corresponding structure throughout the views, and referring in particular to FIG. 1, there is shown a lift apparatus, generally designated 20. The lift 20 includes a frame 22 supporting a lift mechanism 30 including a moveable platform or rack 24. The lift 20 provides for lifting and lowering of articles, such as the boat shown, between a raised position and a lowered position, as explained hereinafter.

Figure 5:
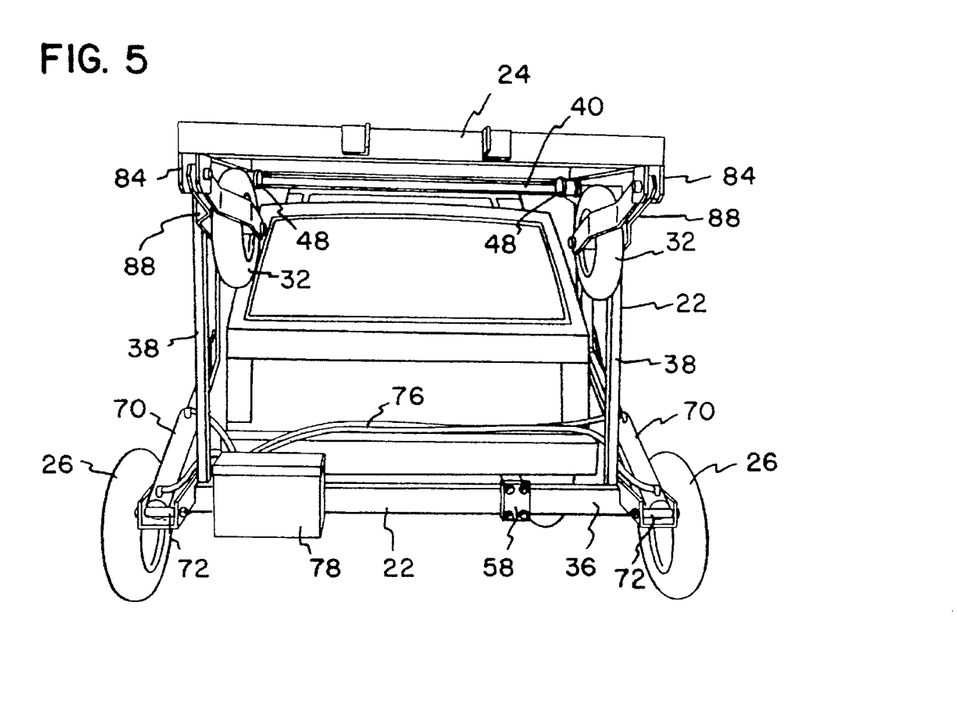
FIG. 5 shows a rear perspective view of the lift apparatus shown in FIG. 1.
Figure 6:
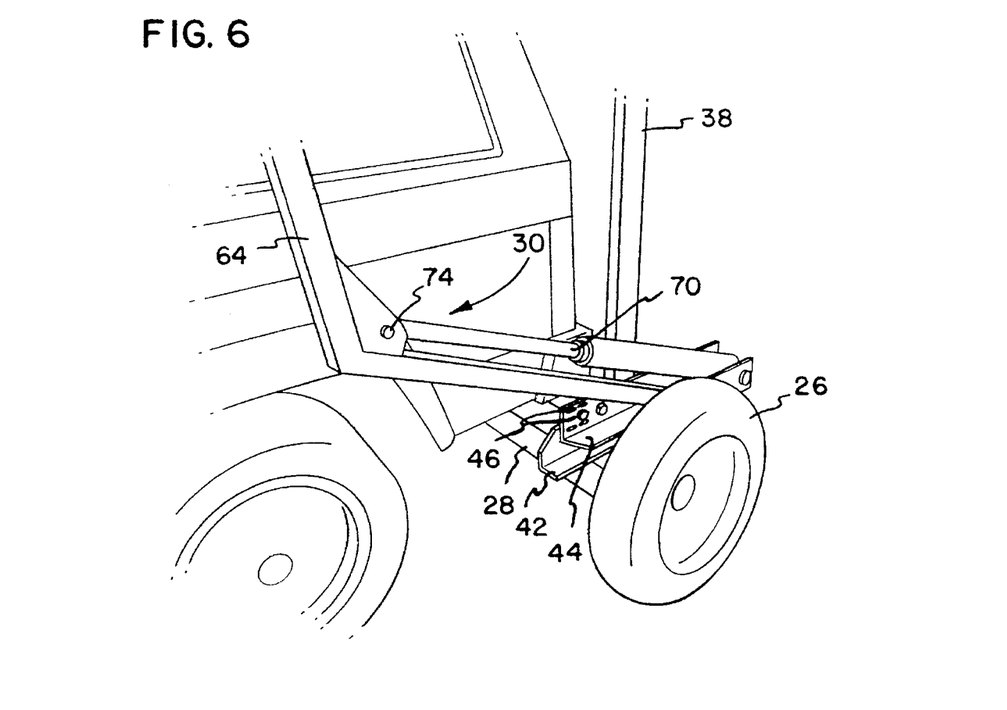
FIG. 6 shows a side perspective view of a portion of the lift apparatus shown in FIG. 1.

Referring now to FIG. 5 and 6, the lift framework 22 includes a lower frame member 36, riser members 38 and an upper cross member 40. The upper cross member 40 includes rollers 48 mounted along a rear edge thereof to support the platform 24 in the raised position and to facilitate easier raising and lowering of the lift 20. As shown in FIG. 6, the wheels 26 are mounted on a wheel assembly 28, which has a suspension including a stabilizer bar in a preferred embodiment. The lower frame member 36 includes a hitch 62 and rides on a suspension of the wheel assembly 28 to provide flexure between the wheel assembly 28 and the frame 22. In this manner, the rear wheels of the vehicle do not lose contact with the ground or force excess pressure against the lift 20. The suspension can take on several forms including rubber pieces mounted intermediate the frame 22 and the wheel assembly 28 or other shock absorber and leaf spring type suspensions which are well known. In addition to providing suspension, adjustment is provided between a mounting bracket 42 and an adjustment bracket 44 adjustably mounting to the mounting bracket. The adjusting bracket 44 and mounting bracket 42 have adjustment slots 46 formed therein receiving bolts or pins so that the relative position may be changed. Changing the relative position varies the height of the lift 20 so that it may be adapted to various size vehicles for various uses.

Figure 7:
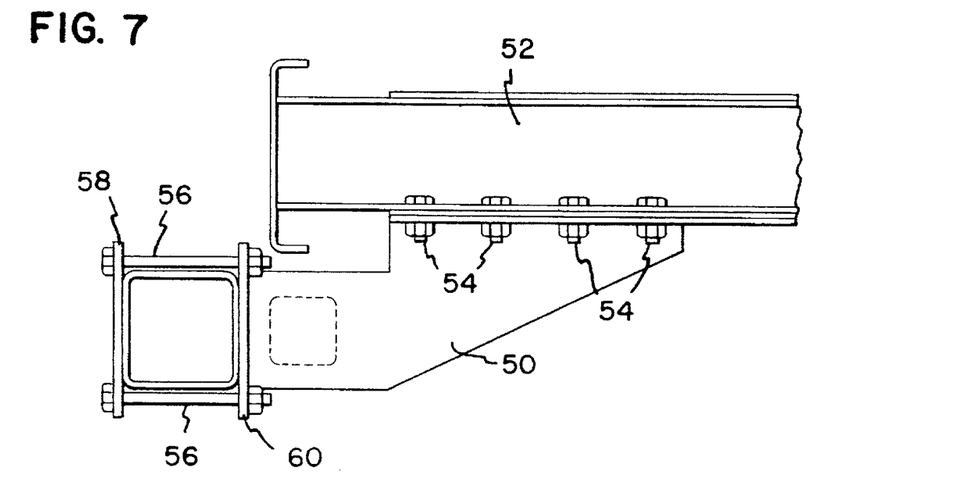
FIG. 7 shows a side detail view of the attachment bracket for the lower frame portion of the lift apparatus shown in FIG. 1.
Figure 8:
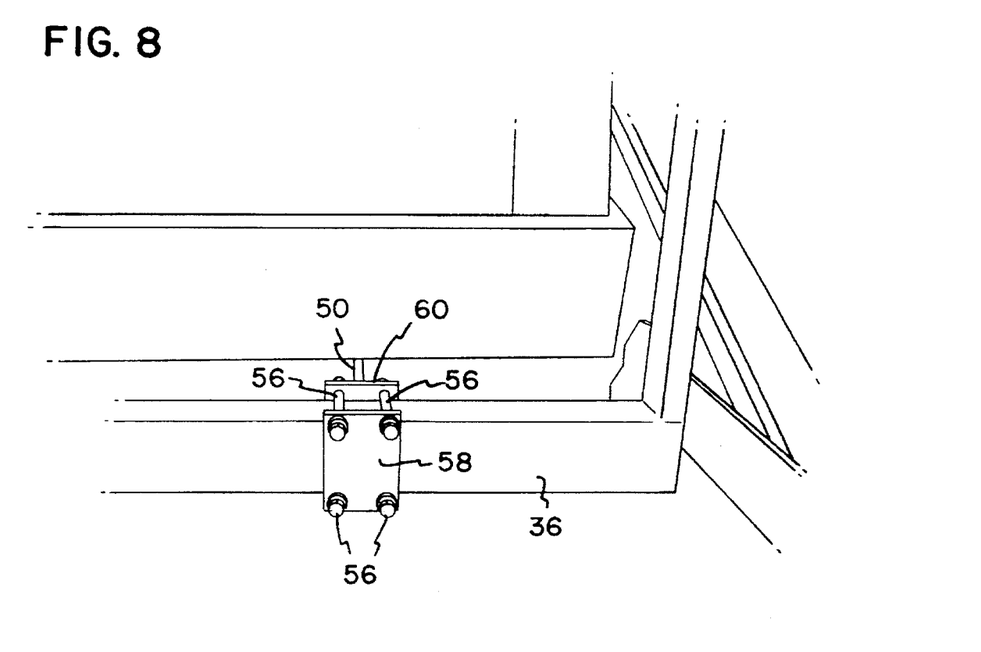
FIG. 8 shows a perspective detail view of the lower frame portion of the lift apparatus shown in FIG. 1.

Referring now to FIGS. 7 and 8, there is shown a mounting bracket 50 for attaching the lift frame 22 to the vehicle frame 52. The bracket 50 attaches to the underside of the frame with a number of bolts 54. Typically, the vehicle will have two frame members 52 extending rearward, therefore two corresponding brackets 50 support the lower frame member 36. The bracket 50 typically extends downward and rearward below the rear bumper of the vehicle. Bolts 56 hold brackets 58 against the lower frame member 36. The bolts 56 attach into vertically extending mounting portions 60 of the mounting bracket 50. In this manner, the lower frame member 36 is detachably secured between the brackets 58 and mounting portions 60 to the mounting bracket 50 and the vehicle frame 52 with enough support and strength to accommodate the lift 20. However, the wheel assembly 28 and frame 22 may be easily removed from the brackets 50 so that the vehicle may be quickly switched between operation with and without the lift 20 attached. Although the frame 22 is shown attached to the vehicle frame 52 with bolts, it can be appreciated that the other quick connect arrangements, which provide secure attachment may be utilized. It can also be appreciated that the wheel assembly 28 and frame 22 can be attached to the frame 52 without a lift to provide added hauling and towing capacity to the vehicle. Moreover, where the lift 20 is supporting very light loads, such as bicycles, an additional set of wheels for support is not needed and the lift may be mounted to the vehicle frame or rear bumper.

Referring again to FIGS. 6 and 1–4, the lift mechanism 30 includes arms 64 mounting to the platform 24 and upper pivot point 66. The arms 64 include a forward bend and an upward bend in the preferred embodiment to extend around the side doors of vehicles when the lift is either raised or lowered. The arms 64 attach to the adjustment bracket 44 at a lower pivot point 68. The hydraulic rams 70 attach to the adjustment bracket 44 at a pivot point 72 and pivotally attach to the arms 64 at pivot points 74. As shown in FIG. 5, the hydraulic pump and controls 78 may be stored in a suitable enclosure and have hydraulic lines 76 extending to the rams 70. Controls may be mounted to the lift or on a cable to provide safe operation away from the lift mechanism 30. Remote controls may also be used to operate the lift.

As shown in FIG. 1, when the platform 24 is in a fully raised position, a forward portion may rest on a roof rack 80 or other support mounted on the roof of the vehicle. The roof rack 80 may be any of well known support racks also used for skis, bicycles or other equipment or which may come from the vehicle manufacturer attached to the roof of the vehicle. The roof rack 80 may take on many configurations depending on the type of vehicle which is being used with the lift 20. When in the raised position, the hydraulic rams 70 are extended and the platform 24 is supported on the roof rack 80 and the upper cross member 40. At this position, the boat or other article is fully lifted off of the ground and does not interfere with operation of the vehicle doors, including the rear hatch. In addition, the hitch 62 may be utilized for towing a trailer. The hydraulic rams 70 prevent accidental lowering of the lift mechanism 30 so that the vehicle may be safely operated with the platform 24 completely raised. However, as an added safety feature, the platform 24 may be tied or secured at its forward end to the vehicle for added load stability.

Figures 2, 10:
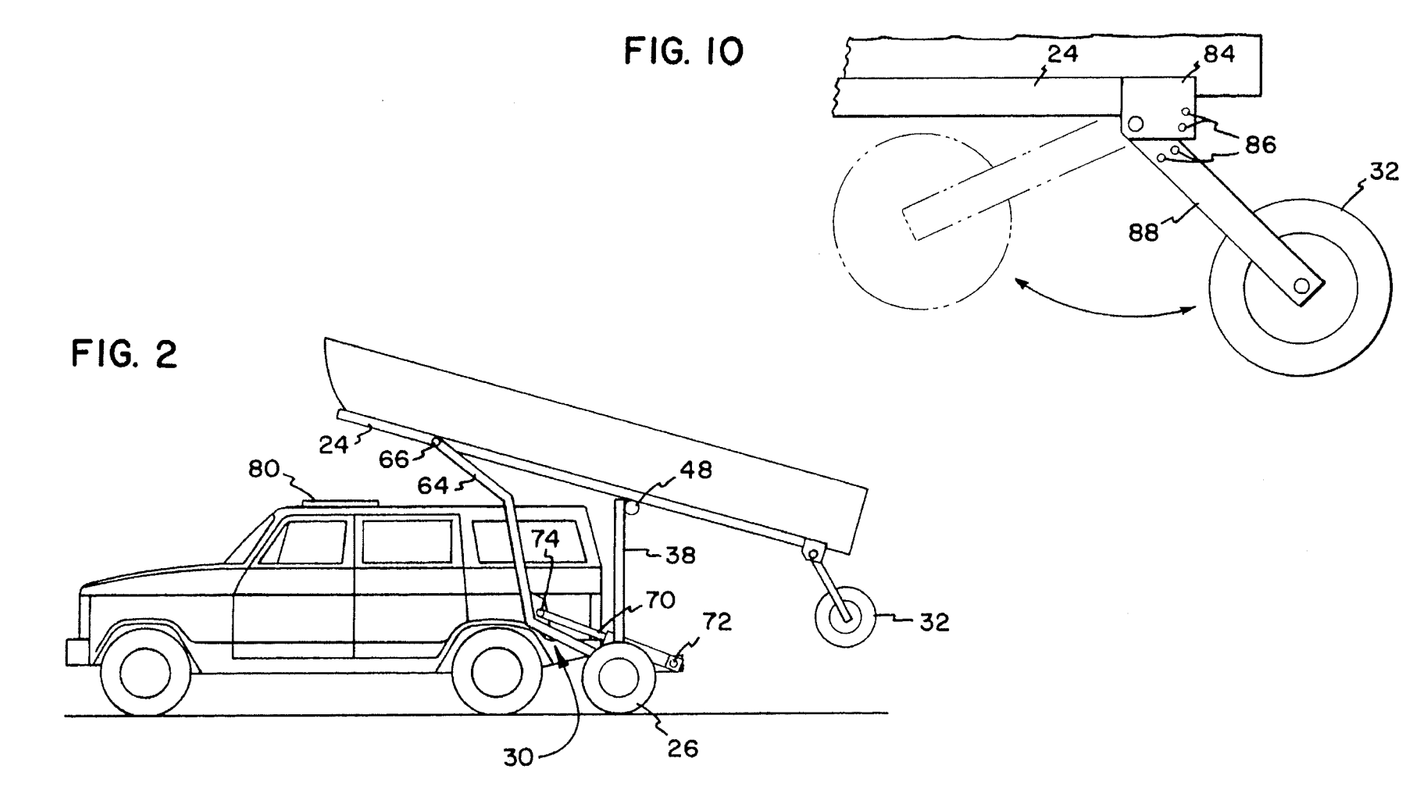
FIG. 2 shows a side elevational view of the lift apparatus shown in FIG. 1 in a partially raised position.
FIG. 10 shows a detail of the platform wheels for the lift apparatus shown in FIG. 1; and, FIG. 11 shows a rear perspective view of a second embodiment of a lift apparatus according to the principles of the present invention.
Figure 3:
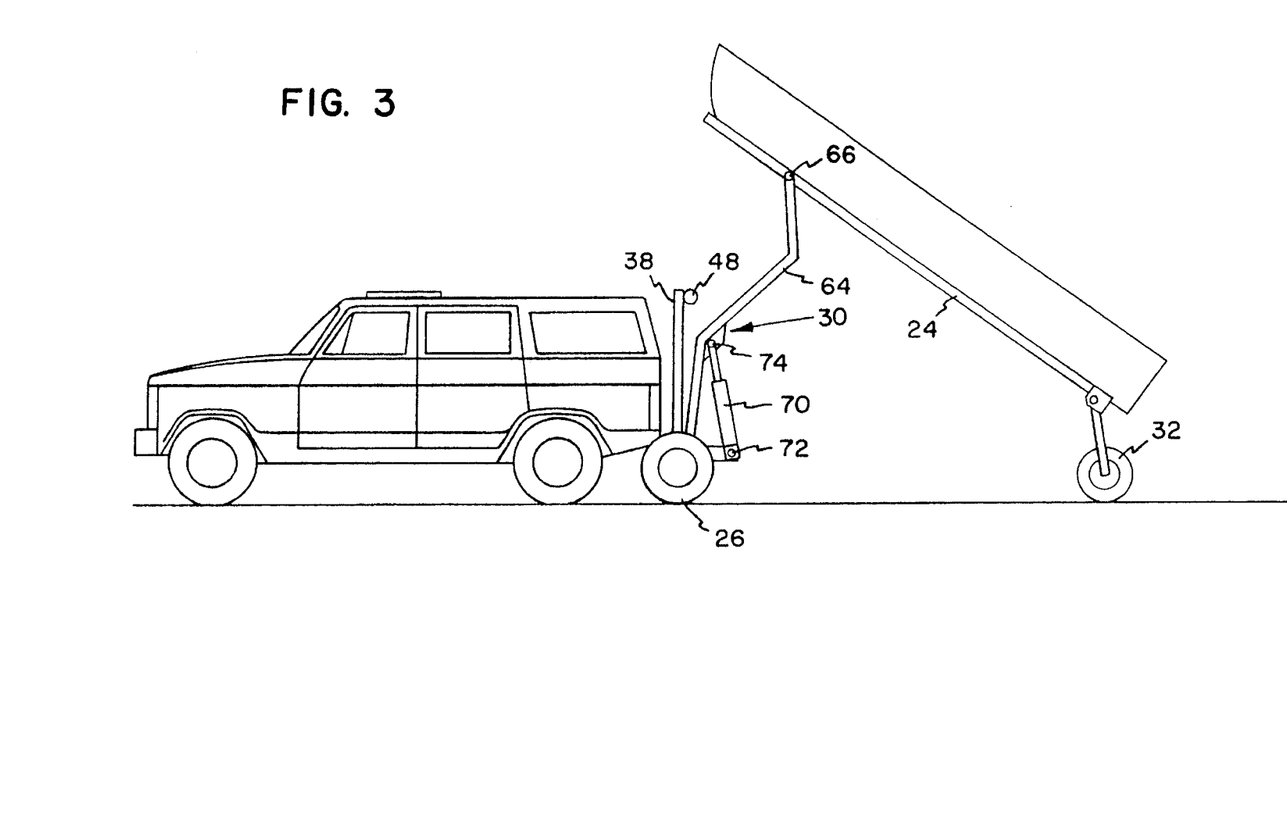
FIG. 3 shows a side elevational view of the lift apparatus shown in FIG. 1 in nearly lowered position.
Figure 4:
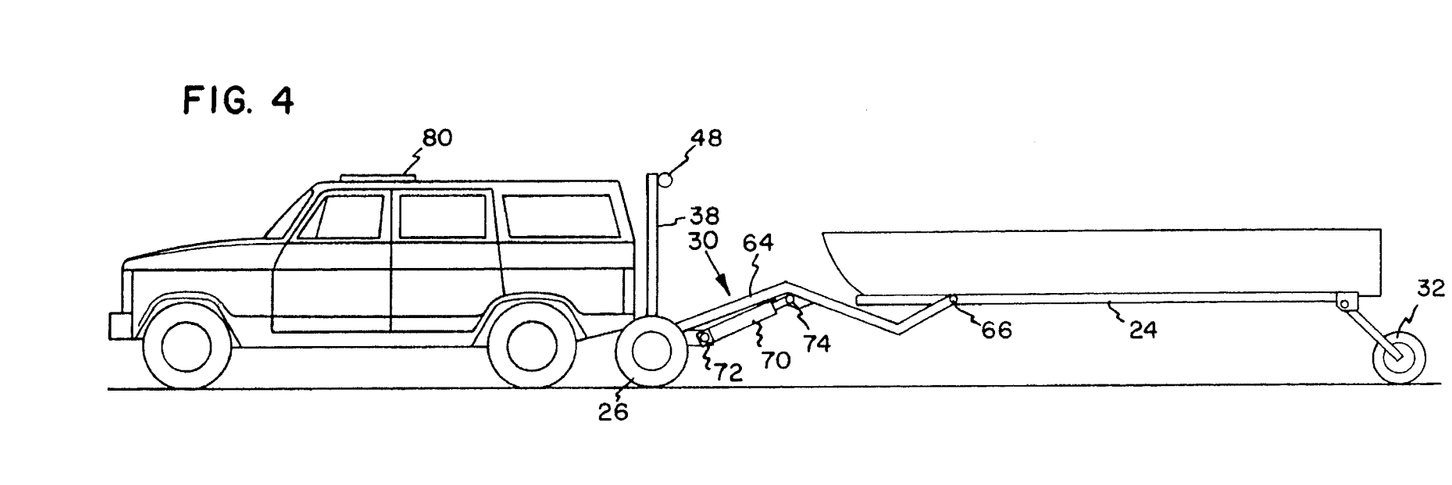
FIG. 4 shows a side elevational view of the lift apparatus shown in FIG. 1 in a fully lowered position.

To lower the platform 24, the hydraulic rams 70 are retracted. This pulls the arms 64 rearward, pivoting the forward portion of the platform 24 upward, as shown in FIG. 2. The rear portion of the platform 24 rests on the rollers 48 and allows for easily sliding over the frame cross member 40 and downward. As the rams 70 are retracted further, the arms 64 continue to pivot rearward so that the platform wheels 32 will engage the ground and lift the platform 24 off of the rollers 48, as shown in FIG. 3. As the arms 64 continue to rotate rearward, the pivot point 66 moves downward, so that the platform 24 also lowers. The arms 64 are rotated to a position where a boat may be easily unloaded or where the article can be easily accessed, depending on the type of article which is being carried and the intended use. At this position, the lift 20 acts as a trailer so that the vehicle may be backed up with the platform 24 aligned for launching a boat. It can be appreciated that a boat may be launched and the vehicle and lift pulled out of the water and then the lift 20 raised again without a boat to provide for easier parking.

To retrieve a boat, the lift mechanism is lowered so that the platform 24 is slightly tilted or substantially horizontal. The platform 24 is then backed into the water to load the boat. The boat is then pulled out of the water and the launching process reversed so that the lift mechanism 30 lifts the platform 24. It can be appreciated that the lift mechanism 30 will pivot the arms 64 forward until the platform 24 engages the rollers 48. At this point, the platform wheels 32 will pivot off the ground. As the arms 64 pivot forward with extension of the hydraulic rams 70, the platform 24 will reach a position supported on the roof rack 80 and the rear rollers 48 in a completely raised position.

As shown in FIG. 1–4, the platform wheels 32 are mounted on a bracket 84 with a strut 88 extending to the wheels 32. As shown in FIG. 10, adjustment holes 86 allow for raising or lowering the angle of the platform wheels 32 and thereby the height of the lowered platform 24 by having removable bolts or pins. It can be appreciated that the platform wheels 32 can be locked in a retracted position extending forward, as shown in FIG. 1. This configuration shortens the distance which the platform extends beyond the rear of the vehicle.

Figure 11:
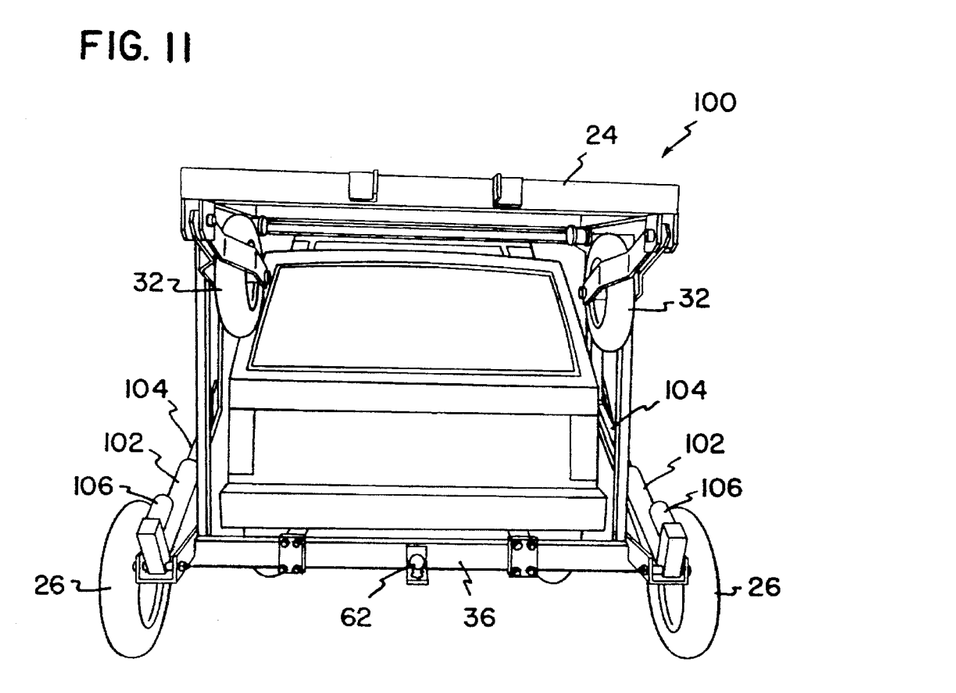

Referring now to FIG. 11, there is shown a second embodiment of the present invention generally designated 100. According to the second embodiment 100, the hydraulic rams are replaced with worm gear type drives 102. Worm gear type drives 102 include a rotatable portion having a nut type member mounted thereon. As the rotatable portion is rotated, the nut does not rotate, thereby moving up or down the threaded portion of the rotatable member to extend and retract the nut portion. Each of the worm gear type drive mechanisms 102 includes an associated electric motor 106.

It can be appreciated that this embodiment does not require hydraulic lines, and can be powered by tapping into the vehicle's electrical system. This also eliminates the need for a storage box for the hydraulic pumps which may be associated with a hydraulic ram type lift. In other respects, the second embodiment operates as the first embodiment. The lift mechanism 102 including the extendible drive members 104 replace the hydraulic rams to extend and retract, thereby pivoting the arms 64 upward or downward.

Figure 9:
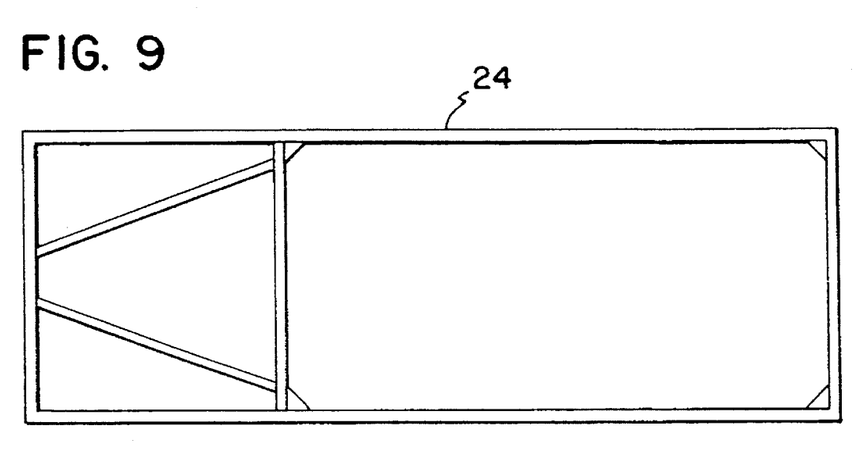
FIG. 9 shows a top plan view of the platform for the lift apparatus shown in FIG. 1.

Referring now to FIG. 9, there is shown the platform for the present invention. It can be appreciated that the configuration of the platform may be altered depending on the purpose for which it is used. For example, there may be rollers or other supports adapted for receiving the bottom of the hull of a boat. In addition, it can be appreciated that canoes, jet skis and other water recreation vehicles, motorcycles and other equipment may also be loaded. In addition, the platform 24 may be configured for hauling construction materials and other equipment. With the flexibility of the present invention, the configuration of the platform may be altered significantly to adapt to the equipment being hauled.

It can be appreciated that with the operation of the present invention, the vehicle requires little modification to adapt to the lift 20 or 100 and is still highway safe. A roof rack 80 may already be in place and the frame 22 may be easily mounted to the vehicle's existing frame. The arms 64 and frame 22 do not interfere with the operation of the vehicle's doors, including side doors and/or rear hatch. The lift 20 blocks very little of the driver's field of vision, making operation much safer than previous lifts. In addition, the frame 22 and arms 64 are configured so that the vehicle's lighting system is still easily viewed by other drivers so that additional lighting of the lift 20 is not needed. It can also be appreciated that the lift frame 22 passes the majority of the added load directly to the wheel assembly 28 and the rear wheels 26. With this configuration, the vehicle does not need a modified suspension to provide support for hauling the articles. With most loads, the roof rack 80 needs to support only 100 to 150 pounds while the rest of the load will be passed to the wheels 26. The lift 20 also provides a hitch 62 so that a trailer may still be towed with the platform 24 raised. Moreover, the present lift apparatus can be adapted to many vehicles and to many different uses without affecting the utility of the vehicle.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An apparatus for raising and supporting an article above a vehicle, comprising:

a wheel assembly including a set of wheels, mounting to a rear of the vehicle;

a platform for supporting the article including supplementary wheels retractably mounted at the rear of the platform;

a lift frame mounting on the wheel assembly;

arms rotatably mounted to the lift frame proximate the wheel assembly, connecting to and supporting the platform at an extended end thereof, wherein the arms rotate between a lowered position and a raised position; and a cross member mounted above the wheel assembly engaging the platform upon actuation of the apparatus from the lowered to the raised position and supporting the platform in the raised position, wherein the article is supported above the platform in the lowered and raised positions.

2. An apparatus according to claim 1, wherein the arms are selectively configured so as to extend around the doors of the vehicle.

3. An apparatus according to claim 1, further comprising rollers on the cross member engaging the platform in the raised position.

4. An apparatus according to claim 1, further comprising a mounting bracket for each supplementary wheel having a plurality of holes formed therein for adjusting the height of the supplementary wheel.

5. An apparatus according to claim 1, wherein the apparatus mounts proximate the vehicle's rear bumper.

6. An apparatus according to claim 1, wherein the platform supports an underside of the article in the raised and the lowered positions.

7. An apparatus according to claim 1, wherein the platform is substantially horizontal in the raised and the lowered positions.

8. A lift apparatus according to claim 1, further comprising means for rotating the arms.

9. A lift apparatus according to claim 1, wherein the wheel assembly is detachably mounted to the vehicle.

10. A lift apparatus according to claim 1, wherein each of the arms comprises an upper bent portion.

11. A folding linkage for supporting objects above a vehicle, comprising:

a wheel assembly attaching at a lower rear portion of the vehicle;

a lift frame including a pair of vertical frame members extending substantially upward from the wheel assembly;

a cross member extending between the vertical frame members proximate an upper portion of the vertical frame members;

a pair of arms, each arm pivotally mounted to the wheel assembly, wherein each of the arms extends outside of each of the frame members; and, a platform pivotally attached at an upper end of the arms and slidably engaging the cross member, and configured for bearing a load above the platform in both a raised position and a lowered position.

12. A linkage according to claim 11, further comprising means for rotating the arms.

13. A linkage according to claim 11, wherein the wheel assembly is detachably mounted to the vehicle.

14. A linkage according to claim 11, wherein each of the arms comprises an upper bent portion.

15. An apparatus for raising and supporting an article above a vehicle, comprising:

a platform for supporting the article;

arms rotatably mounted to a pivot at a lower rear portion of the vehicle and to the platform, wherein the arms rotate between a lowered position and a raised position;

a stationary support frame including vertical support members attached to a cross member mounted above the pivot for engaging the platform upon actuation of the apparatus from a lowered to a raised position and supporting the platform in the raised position.

16. A load support for a vehicle, comprising:

a wheel assembly;

a platform;

a support frame including a cross member for bearing a load above the support frame, mounting to the wheel assembly;

bracket means detachably mounting the support frame to a lower rear frame of the vehicle and extending below the vehicle frame;

arms rotatably mounted to a pivot point at the wheel assembly, wherein the arms connect to and support the platform in a substantially horizontal orientation in a raised position and a lowered position, and wherein the platform pivotally attaches at an upper end of the arms and slidably engages the cross member; and, means for detachably mounting the support frame to the bracket means.

17. A load support according to claim 16, further comprising suspension means for providing suspension between the wheel assembly and the support frame.

18. An apparatus for raising and supporting an article above a vehicle, comprising:

a wheel assembly including a set of wheels, mounting to a rear of the vehicle;

a platform for supporting the article;

a lift frame mounting on the wheel assembly;

arms rotatably mounted to the lift frame proximate the wheel assembly rotating between a lowered position and a raised position, each arm including a lower portion, a center portion bending in a forward direction, and an upper portion bending in an upward direction; and a cross member mounted above the wheel assembly engaging the platform upon actuation of the apparatus from the lowered to the raised position and supporting the platform in the raised position.

19. A folding linkage for supporting objects above a vehicle, comprising:

a lift frame attaching at a lower rear portion of the vehicle including a pair of vertical frame members extending substantially upward from the vehicle;

a cross member extending between the vertical frame members proximate an upper portion of the vertical frame members;

a pair of arms, each arm pivotally mounted to the lift frame, wherein each of the arms extends outside of each of the frame members and includes a lower portion, a center portion bending in a forward direction, and an upper portion bending in an upward direction; and a platform pivotally attached at an upper end of the arms and slidably engaging the cross member.

20. An apparatus for raising and supporting an article above a vehicle, comprising:

a lift frame attaching at a lower rear portion of the vehicle supporting a cross member at an upper rear portion of the vehicle;

a platform for supporting the article in a raised and a lowered position;

arms rotatably mounted to a pivot point at a lower rear portion of the vehicle, wherein the arms connect to and support the platform in a substantially horizontal orientation in the raised position and the lowered position, and wherein the platform pivotally attaches at an upper end of the arms and slidably engages the cross member.

21. An apparatus according to claim 20, wherein the arms rotate backward when supporting the platform in a lowered position.

22. An apparatus for raising and supporting an article above a vehicle, comprising:
- a wheel assembly including a set of wheels, mounting to a rear of the vehicle;
- a platform for supporting the article including supplementary wheels adjustably mounted at the rear of the platform;
- a lift frame mounting on the wheel assembly;
- arms rotatably mounted to the lift frame proximate the wheel assembly, connecting to and supporting the platform at an extended end thereof, wherein the arms rotate between a lowered position and a raised position; and
- a cross member mounted above the wheel assembly engaging the platform upon actuation of the apparatus from the lowered to the raised position and supporting the platform in the raised position, wherein the article is supported above the platform in the lowered and raised positions.

23. An apparatus for raising and supporting an article above a vehicle, comprising:
- a wheel assembly including a set of wheels, mounting to a rear of the vehicle;
- a platform for supporting the article;
- a lift frame mounting on the wheel assembly;
- arms rotatably mounted to the lift frame proximate the wheel assembly, connecting to and supporting the platform at an extended end thereof, wherein the arms rotate between a lowered position and a raised position; and
- a cross member mounted above the wheel assembly having rollers mounted thereon engaging the platform upon actuation of the apparatus from the lowered to the raised position and supporting the platform in the raised position, wherein the article is supported above the platform in the lowered and raised positions.

* * * * *